United States Patent
Hwang et al.

(10) Patent No.: US 10,384,529 B2
(45) Date of Patent: Aug. 20, 2019

(54) POWER TRANSMISSION APPARATUS FOR HYBRID ELECTRIC VEHICLE

(71) Applicant: Hyundai Motor Company, Seoul (KR)

(72) Inventors: Seongwook Hwang, Gunpo-si (KR); Won-jun Sung, Seoul (KR); Jaechang Kook, Hwaseong-si (KR); Wonmin Cho, Hwaseong-si (KR); Myeonghoon Noh, Seongnam-si (KR); Ildae Cho, Seoul (KR); Seongwook Ji, Ansan-si (KR); Kangsoo Seo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 372 days.

(21) Appl. No.: 15/298,426

(22) Filed: Oct. 20, 2016

(65) Prior Publication Data
US 2017/0036530 A1     Feb. 9, 2017

Related U.S. Application Data

(62) Division of application No. 14/559,573, filed on Dec. 3, 2014, now Pat. No. 9,616,739.

(30) Foreign Application Priority Data

Sep. 25, 2014   (KR) .......................... 10-2014-0128435

(51) Int. Cl.
F16H 37/02     (2006.01)
F16H 37/08     (2006.01)
(Continued)

(52) U.S. Cl.
CPC ................ B60K 6/543 (2013.01); B60K 6/36 (2013.01); B60K 6/48 (2013.01); F16H 3/006 (2013.01);
(Continued)

(58) Field of Classification Search
CPC .......... F16H 2702/06; F16H 2037/023; F16H 2037/0873; F16H 2037/0886
(Continued)

(56) References Cited

U.S. PATENT DOCUMENTS 4,539,866 A * 9/1985 Koivunen ............. F16H 37/021
                                                            475/204
4,599,916 A    7/1986 Hirosawa
(Continued)

FOREIGN PATENT DOCUMENTS

CN          1869479 A       11/2006
CN        201407326 Y        2/2010
(Continued)

*Primary Examiner* — Ha Dinh Ho
(74) *Attorney, Agent, or Firm* — Morgan, Lewis & Bockius LLP (57) ABSTRACT

A transmission for a vehicle may include a first input shaft selectively connected to an engine through a first clutch, a second hollow input shaft disposed in a front side portion of the first input shaft and selectively connected to the engine through a second clutch, a continuously variable transmission mechanism (CV) that continuously shifts and outputs rotation power transferred from the first input shaft, a shift output mechanism that receives rotation power transferred from driving gears on the second input shaft and the CV through driven gears connected to an external gear and selectively shifts and outputs the rotation power, a reverse idle mechanism that transfers the rotation power of the first input shaft to the shift output mechanism in a reverse direction, and a final reduction mechanism that reduces the rotation power output from the shift output mechanism.

5 Claims, 6 Drawing Sheets

(51) Int. Cl.

| | |
|---|---|
| *B60K 6/543* | (2007.10) |
| *F16H 9/04* | (2006.01) |
| *B60K 6/36* | (2007.10) |
| *B60K 6/48* | (2007.10) |
| *F16H 3/00* | (2006.01) |
| *F16H 3/089* | (2006.01) |
| *F16H 9/16* | (2006.01) |
| *F16H 37/06* | (2006.01) |

(52) U.S. Cl.
CPC ............ *F16H 3/089* (2013.01); *F16H 9/04* (2013.01); *F16H 9/16* (2013.01); *F16H 37/021* (2013.01); *F16H 37/065* (2013.01); *B60Y 2200/92* (2013.01); *B60Y 2400/72* (2013.01); *F16H 2200/0021* (2013.01); *Y10S 903/902* (2013.01); *Y10S 903/918* (2013.01)

(58) Field of Classification Search
USPC ........................................ 74/664, 661, 665 R
See application file for complete search history.

(56) References Cited

U.S. PATENT DOCUMENTS

| | | | |
|---|---|---|---|
| 6,306,057 B1 | 10/2001 | Morisawa | |
| 7,097,583 B2 | 8/2006 | Lauinger | |
| 7,544,141 B2* | 6/2009 | Holmes | B60K 6/40 475/5 |
| 7,980,980 B2* | 7/2011 | Rask | B60K 6/445 475/5 |
| 8,444,516 B2 | 5/2013 | Tamai | |
| 2008/0103002 A1* | 5/2008 | Holmes | B60K 6/365 475/5 |
| 2013/0210574 A1 | 8/2013 | Girard | |

FOREIGN PATENT DOCUMENTS

| | | |
|---|---|---|
| CN | 101956815 A | 1/2011 |
| CN | 203258048 U | 10/2013 |
| CN | 103867657 A | 6/2014 |
| EP | 0 119 935 B1 | 3/1988 |
| EP | 1 347 209 B1 | 4/2009 |
| JP | 2000-346169 A | 12/2000 |
| JP | 2010-261544 A | 11/2010 |
| JP | 2010-276159 A | 12/2010 |
| KR | 10-0168392 B1 | 1/1999 |
| KR | 2003-0082876 A | 10/2003 |
| KR | 10-0490639 B1 | 5/2005 |

\* cited by examiner

| Shift Gear | CL1 | CL2 | SL1 | | | SL2 | | |
|---|---|---|---|---|---|---|---|---|
| | | | D1 | N | D2 | COG | N | ROG |
| Reverse | △ | | ◉ | ● | | | | ● |
| N | | | ◉ | ● | | | ● | ◉ |
| U/D (first stage) | | △ | ● | | | ◉ | ● | ◉ |
| CVT | △ | | ◉ | ● | ◉ | ● | | |
| O/D | | △ | | | ● | ◉ | ● | |

△ : Clutch Engage  ● : Shift position
◉ : Pre-selectable position

| Shift Gear | E/C | CL1 | CL2 | SL1 | | | SL2 | | |
|---|---|---|---|---|---|---|---|---|---|
| | | | | D1 | N | D2 | COG | N | ROG |
| Reverse | △ | △ | | ⊕ | ● | | | | ● |
| EV Reverse | | △ | | ⊕ | ● | | | | ● |
| N | (△) | | | ⊕ | ● | | | ● | ⊕ |
| EV U/D | | | △ | ● | | | ⊕ | ● | ⊕ |
| EV CVT | | △ | | ⊕ | ● | ⊕ | ● | | |
| EV O/D | | | △ | | | ● | ⊕ | ● | |
| U/D (first stage) | △ | | △ | ● | | | ⊕ | ● | ⊕ |
| CVT | △ | △ | | ⊕ | ● | ⊕ | ● | | |
| O/D | △ | | △ | | | ● | ⊕ | ● | |

△ : Clutch Engage  ● : Shift position
⊕ : Pre-selectable position

| Shift Gear | E/C | CL1 | CL2 | SL1 | | | SL2 | |
|---|---|---|---|---|---|---|---|---|
| | | | | D1 | N | D2 | COG | N |
| EV Reverse | | | △ | ● | | | | ● |
| N | (△) | | | ◉ | ● | | | ● |
| EV U/D | | | △ | ● | | | ◉ | ● |
| EV CVT | | △ | | ◉ | ● | ◉ | ● | |
| EV O/D | | | △ | | | ● | ◉ | ● |
| U/D (first stage) | △ | | △ | ● | | | ◉ | ● |
| CVT | △ | △ | | ◉ | ● | ◉ | ● | |
| O/D | △ | | △ | | | ● | ◉ | ● |

△ : Clutch Engage  ● : Shift position
◉ : Pre-selectable position

POWER TRANSMISSION APPARATUS FOR HYBRID ELECTRIC VEHICLE

CROSS-REFERENCE TO RELATED APPLICATION

The present application is a Divisional of U.S. patent application Ser. No. 14/559,573, filed Dec. 3, 2014, which claims priority of Korean Patent Application Number 10-2014-0128435 filed on Sep. 25, 2014, the entire contents of which are incorporated herein for all purposes by these references.

BACKGROUND OF THE INVENTION

Field of the Invention

The present invention relates to a transmission for a vehicle. More particularly, the present invention relates to a transmission for a vehicle that can improve fuel consumption and power performance by minimizing a power loss at a low speed and a high speed and by enlarging a width of a shift ratio using a plurality of external gear sets and a continuously variable transmission mechanism (CV).

Description of the Related Art

When transferring rotation power that is output from an engine through a fluid type of electric motion means such as a torque converter or fluid coupling, a common continuously variable transmission (CVT) continuously shifts rotation power thereof by a CV and transfers the shifted rotation power to an output shaft.

The CV includes variable pulleys that are disposed at each of a driving side and a driven side and a metal belt that connects variable pulleys of the driving side and the driven side, and is a device that continuously controls a shift ratio by controlling widths of the opposing variable pulleys by a hydraulic pressure.

The shift ratio is obtained by detecting driving conditions such as a vehicle speed, an engine rotation speed, and a load and by controlling opening of a shift ratio control valve that is connected to variable pulleys of the driving side and the driven side according to a preset shift pattern.

A two-stage range shift continuously variable transmission of which research and development have been actively performed is generally formed with a front and reverse driving and shift gear control means including at least one planetary gear set, a shift ratio variable means including a CV, and at least one external gear set to perform continuous shifting of two forward speeds and one reverse speed.

However, as described above, in a two-stage range shift continuously variable transmission, as at least one planetary gear set is applied, the two-stage range shift continuously variable transmission has a large volume while having a complex configuration and is thus disadvantageous in view of mounting and weight, and this is detrimental for enhancement of fuel consumption.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a transmission for a vehicle having advantages of being capable of improving fuel consumption and power performance by minimizing a power loss at a low speed and a high speed by enlarging a width of a shift ratio using a plurality of external gear sets and a continuously variable transmission mechanism CV.

The present invention may further provide a transmission for a vehicle having advantages of being capable of being applied to a hybrid vehicle while performing EV and HEV mode driving by additionally disposing a motor/generator and an engine clutch.

Various aspects of the present invention provide a transmission for a vehicle, including: a first input shaft that is selectively connected to an output side of an engine through a first clutch; a second input shaft that is a hollow shaft and that is disposed in a front side portion of the first input shaft without rotation interference with the first input shaft and that is selectively connected to the output side of the engine through a second clutch, wherein a plurality of driving gears having different numbers of gear teeth are disposed on an exterior circumferential surface of the second input shaft; a continuously variable transmission mechanism (CV) that continuously shifts and outputs rotation power that is transferred from the first input shaft; a shift output mechanism that is disposed substantially in parallel at a predetermined gap from the first and second input shafts to receive rotation power that is transferred from the driving gears on the second input shaft and the CV through driven gears that are connected to an external gear and that selectively shifts and outputs the rotation power; a reverse idle mechanism that is disposed between the first input shaft and the shift output mechanism to transfer the rotation power of the first input shaft to the shift output mechanism in a reverse direction; and a final reduction mechanism that reduces the rotation power that is output from the shift output mechanism.

A reverse driving gear for reversing may be disposed at one side on the first input shaft, a first driving gear and a second driving gear having different numbers of gear teeth on the exterior circumferential surface of the second input shaft may be disposed at a predetermined distance, and a continuous shift driving gear may be disposed on a driven pulley shaft of the CV.

The shift output mechanism may include: an output shaft that is disposed substantially in parallel at the predetermined gap from the first and second input shafts; an output gear that is integrally formed in one end portion of the output shaft; a first driven gear that is disposed on the output shaft to be an external gear connected to the first driving gear; a second driven gear that is disposed on the output shaft to be an external gear connected to the second driving gear; a first synchronizer that is formed between the first driven gear and the second driven gear on the output shaft to selectively synchronization-connect the first driven gear or the second driven gear to the output shaft; a continuous shift driven gear that is disposed on the output shaft to be an external gear connected to the continuous shift driving gear; a reverse driven gear that is disposed on the output shaft to be an external gear connected to the reverse driving gear through the reverse idle mechanism; and a second synchronizer that is formed between the continuous shift driven gear and the reverse driven gear on the output shaft to selectively synchronization-connect the continuous shift driven gear or the reverse driven gear to the output shaft.

The first driving gear and the first driven gear may have a smaller gear ratio than that of the continuous shift driving gear and the continuous shift driven gear, and the second driving gear and the second driven gear may have a larger gear ratio than that of the continuous shift driving gear and the continuous shift driven gear.

The reverse idle mechanism may include: a reverse idle shaft that is disposed substantially in parallel between the first input shaft and the output shaft; and a reverse idle gear that is integrally formed in the reverse idle shaft to be an external gear connected between the reverse driving gear and the reverse driven gear.

In the CV, a driving pulley and a driven pulley may continuously shift with a continuous gear ratio of a constant width.

The transmission may further include: a motor/generator connected to the output side of the engine at a front side of the first and second clutches; and an engine clutch that is formed between the output side of the engine and the motor/generator.

According to various aspects of the present invention, by adding a low speed gear, a high speed gear, and a fixed shift gear to a belt-type CV, a vehicle can drive with the fixed shift gear in starting and a high speed area.

Therefore, in starting and a high speed area requiring maximum hydraulic pressure, pulley hydraulic pressure supply for belt driving is unnecessary and thus a hydraulic pressure loss is reduced and a driving loss of an oil pump is minimized and thus fuel consumption can be largely improved.

By removing a planetary gear set and a torque converter that are used in an existing continuously variable transmission, a configuration is simplified and a driving and friction loss can be reduced and thus fuel consumption can be largely improved.

By using a dual clutch, when a CVT shift is converted to an external gear shift or when an external gear shift is converted to a CVT shift, shift shock can be reduced.

Further, when additionally applying a motor/generator MG as an auxiliary power source, a transmission according to the present invention can be used as a transmission for a hybrid electric vehicle that can perform regenerative braking and EV driving.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification. In the following description, terms such as first and second are used for distinguishing elements having the same name and are not limited to order thereof.

Figure 1:
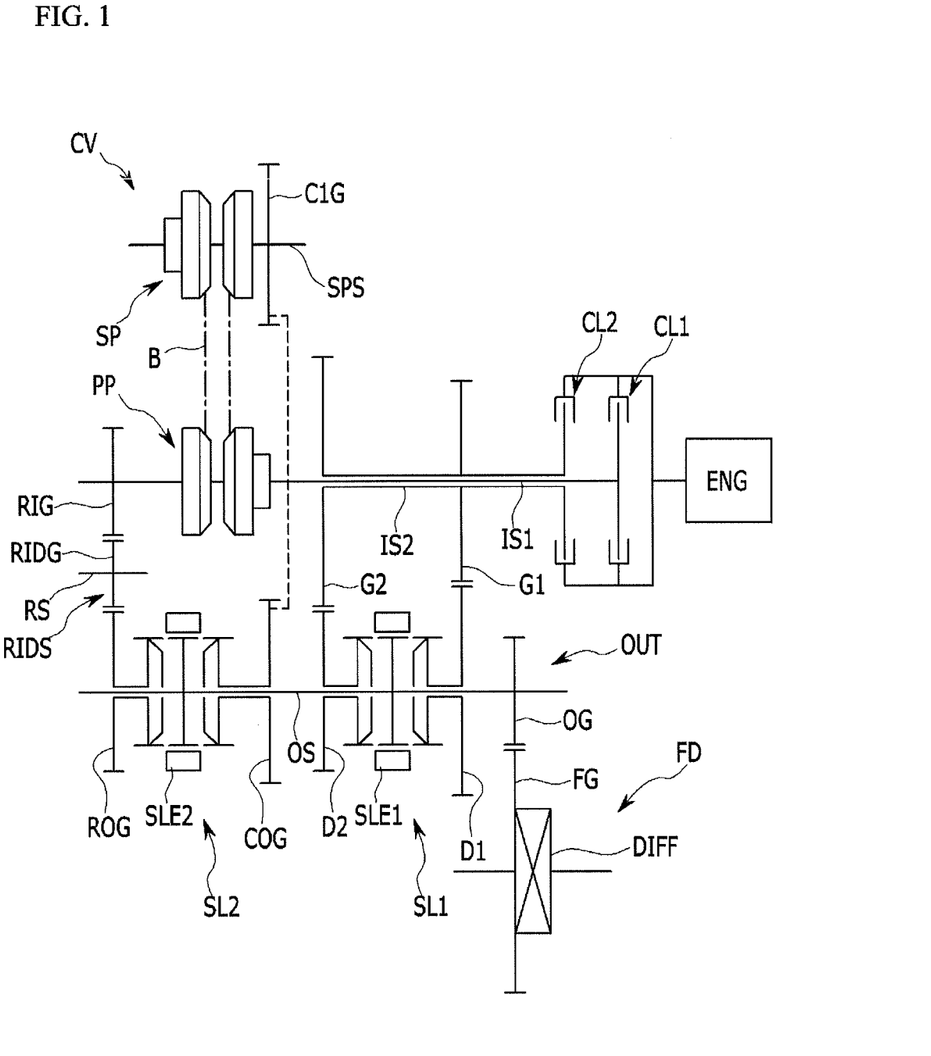
FIG. 1 is a schematic view illustrating a first exemplary transmission according to the present invention.

FIG. 1 is a schematic view illustrating a transmission according to a first exemplary embodiment of the present invention. Referring to FIG. 1, a transmission according to a first exemplary embodiment of the present invention includes first and second input shafts IS1 and IS2, first and second clutches CL1 and CL2, a continuously variable transmission mechanism CV, a shift output mechanism OUT, a reverse idle mechanism RIDS, and a final reduction mechanism FD that are connected to the output side of an engine ENG, which is a power source.

As the engine ENG, which is a main power source, known various engines such as a gasoline engine or a diesel engine using existing fossil fuels may be used.

The first input shaft IS1 is selectively connected to the output side of the engine ENG through the first clutch CL1, and the second input shaft IS2 is a hollow shaft and is disposed without rotation interference at the external circumference side of a front side portion of the first input shaft IS1 to be selectively connected to the output side of the engine ENG through the second clutch CL2.

A reverse driving gear RIG is integrally or monolithically formed at the rear side of the CV on the first input shaft IS1.

First and second driving gears G1 and G2 having a different number of gear teeth are integrally or monolithically formed on the second input shaft IS2.

The first and second clutches CL1 and CL2 may be common fluid multiplate clutches, and are controlled to operate or not operate by a hydraulic pressure control system.

The CV includes a primary pulley PP which is a driving pulley that is connected to the first input shaft IS1, a secondary pulley SP which is a driven pulley that is formed on a driven pulley shaft SPS that is disposed in parallel or substantially in parallel to the first input shaft IS1, and a belt B that connects the primary pulley PP and the secondary pulley SP.

The primary pulley PP and the secondary pulley SP are each formed with a fixed sheave and a moving sheave, as is known, and the moving sheave applies a side force to a side surface of a belt B to correspond to a driving torque by a hydraulic pressure, and thus transfers power while performing continuous shifting with a continuous gear ratio of a constant width according to a diameter change of the respective pulleys PP and SP.

A continuous shift driving gear CIG is integrally or monolithically formed at one side on the driven pulley shaft SPS.

A shift output mechanism OUT includes an output shaft OS that is disposed in parallel or substantially in parallel at a predetermined gap or distance from the first and second input shafts IS1 and IS2, first and second driven gears D1 and D2 that are disposed at one side on the output shaft OS, a first synchronizer SL1 that is disposed between the first and second driven gears D1 and D2 on the output shaft OS, a continuous shift driven gear COG and reverse driven gear RUG that are disposed at the other side on the output shaft OS, and a second synchronizer SL2 that is disposed between the continuous shift driven gear COG and the reverse driven gear RUG on the output shaft OS.

Here, the first synchronizer SL1 is disposed at the front side of the output shaft OS together with the first and second driven gears D1 and D2, and the second synchronizer SL2 is disposed at the rear side of the output shaft OS together with the continuous shift driven gear COG and the reverse driven gear RUG.

The first driven gear D1 is an external gear connected to the first driving gear G1, and the second driven gear D2 is an external gear connected to the second driving gear G2.

Therefore, the first synchronizer SL1 selectively synchronization-connects the first driven gear D1 or the second driven gear D2 to the output shaft OS.

Further, the continuous shift driven gear COG is external gear connected to the continuous shift driving gear CIG on the driven pulley shaft SPS, and the reverse driven gear RUG is external gear connected to the reverse driving gear RIG that is integrally or monolithically formed on the first input shaft IS1 through the reverse idle mechanism RIDS.

In this case, in the reverse idle mechanism RIDS, a reverse idle shaft RS is disposed in parallel or substantially in parallel between the first input shaft IS1 and the output shaft OS, and on the reverse idle shaft RS, a reverse idle gear RIDG that is external gear connected between the reverse driving gear RIG and the reverse driven gear RUG is integrally or monolithically formed.

Therefore, the second synchronizer SL2 selectively synchronization-connects the continuous shift driven gear COG or the reverse driven gear RUG to the output shaft OS.

The first driving gear G1 and the first driven gear D1 are formed to have a smaller gear ratio than that of the continuous shift driving gear CIG and the continuous shift driven gear COG, and the second driving gear G2 and the second driven gear D2 are formed to have a larger gear ratio than that of the continuous shift driving gear CIG and the continuous shift driven gear COG.

Rotation power that is shifted through the shift output mechanism OUT is transferred to the final reduction mechanism FD through an output gear OG that is mounted in a front end portion of the output shaft OS.

As is known, the final reduction mechanism FD includes a final reduction gear FG and a differential DIFF that are external gears connected to the output gear OG.

Figure 2:
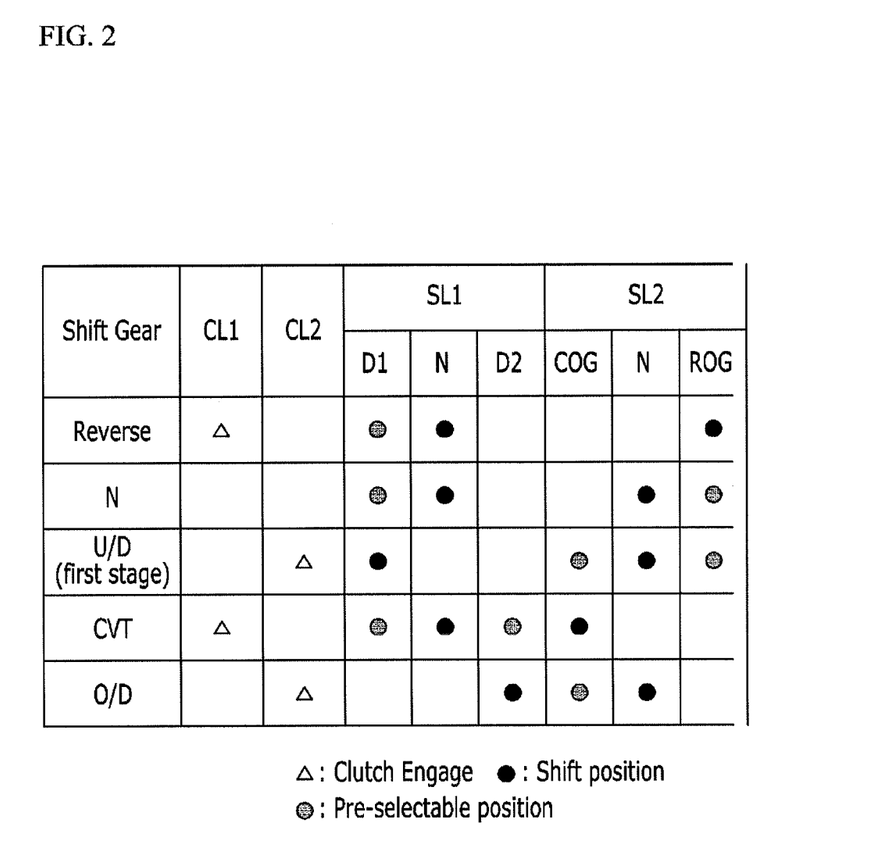
FIG. 2 is a shift operation table of a first exemplary transmission according to the present invention.

FIG. 2 is a shift operation table of a transmission according to a first exemplary embodiment of the present invention, and a shift process is as follows.

Reverse

In a reverse shift gear, when synchronization-connecting the reverse driven gear ROG and the output shaft OS through a sleeve SLE2 of the second synchronizer SL2 and when controlling operation of the first clutch CL1, reverse shifting is performed.

Therefore, while rotation power of the engine ENG is transferred to the final reduction mechanism FD through the first clutch CL1, the first input shaft IS1, the reverse driving gear RIG, the reverse idle mechanism RIDS, the reverse driven gear ROG, the output shaft OS, and the output gear OG, reverse driving is performed.

U/D

Because an underdrive (U/D) shift gear requires maximum hydraulic pressure in the continuously variable transmission mechanism CV when the vehicle starts, by lowering the hydraulic pressure, the U/D shift gear performs shifting for reducing a driving loss of an oil pump.

Therefore, upon starting, the first driven gear D1 and the output shaft OS are synchronization-connected through a sleeve SLE1 of the first synchronizer SL1, and when controlling operation of the second clutch CL2, U/D shifting of a low speed is performed.

Therefore, while rotation power of the engine ENG is transferred to the final reduction mechanism FD through the second clutch CL2, the second input shaft IS2, the first driving gear G1, the first driven gear D1, the output shaft OS, and the output gear OG, U/D driving is performed.

CVT

After the vehicle is started with the U/D shift gear, the vehicle runs in a CVT shift gear, and at a CVT segment, the continuous shift driven gear COG and the output shaft OS are synchronization-connected through the sleeve SLE2 of the second synchronizer SL2, and when operation of the first clutch CL1 is controlled, CVT shifting is performed.

At the CVT segment, as is known, while a diameter of the primary pulley PP and the secondary pulley SP is changed according to a driving condition of the vehicle, continuous shifting is performed.

Therefore, while rotation power of the engine ENG is transferred to the final reduction mechanism FD through the first clutch CL1, the first input shaft IS1, the primary pulley PP, the belt B, the secondary pulley SP, the driven pulley shaft SPS, the continuous shift driving gear CIG, the continuous shift driven gear COG, the output shaft OS, and the output gear OG, CVT driving is performed.

O/D

An overdrive (O/D) shift gear is a shift gear that can minimize a power loss by shifting with a separate shift gear using an external gear without using the CV in a high speed area having a large power loss.

That is, at the CVT segment, at a predetermined speed or more, the second driven gear D2 and the output shaft OS are synchronization-connected through the sleeve SLE2 of the second synchronizer SL2, and when operation of the second clutch CL2 is controlled, O/D shifting of a high speed is performed.

Therefore, while rotation power of the engine ENG is transferred to the final reduction mechanism FD through the second clutch CL2, the second input shaft IS2, the second driving gear G2, the second driven gear D2, the output shaft OS, and the output gear OG, O/D driving is performed.

As described above, by adding a fixed shift gear of a low speed and a high speed to a belt type of CV, the transmission according to a first exemplary embodiment of the present invention may drive with a fixed shift gear in starting and high speed areas.

Therefore, in starting and high speed areas requiring maximum hydraulic pressure, because pulley hydraulic pressure supply for belt driving is unnecessary, a hydraulic pressure loss is reduced, and by minimizing a driving loss of an oil pump, fuel consumption can be largely improved.

Further, by removing a planetary gear set and a torque converter that are used in an existing continuously variable transmission, a configuration is simplified and a driving and friction loss can be reduced and thus fuel consumption can be largely improved.

Further, by using a dual clutch, when CVT shift is converted to an external gear shift or when the external gear shift is converted to a CVT shift, a shift shock can be minimized.

Figure 3:
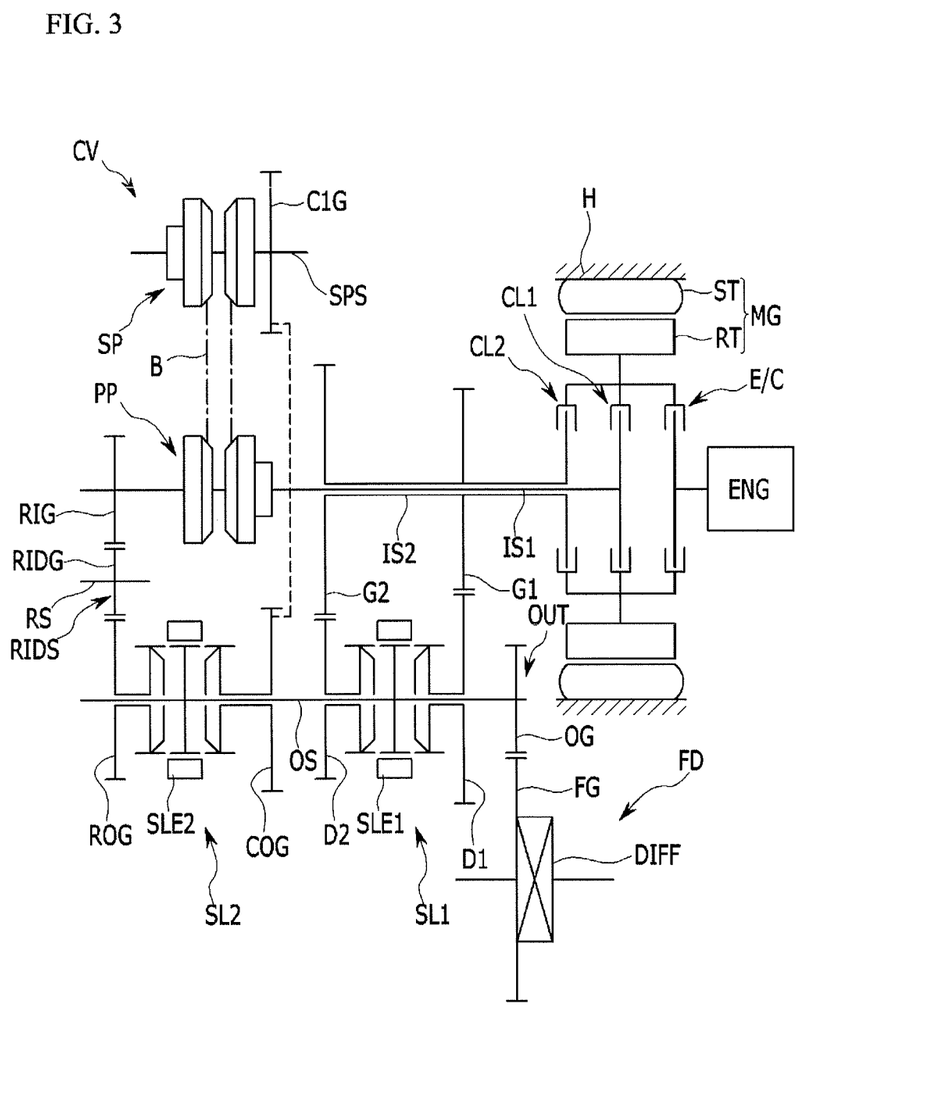
FIG. 3 is a schematic view illustrating a second exemplary transmission according to the present invention.

FIG. 3 is a schematic view illustrating a transmission according to a second exemplary embodiment of the present invention. Referring to FIG. 3, in the transmission according to the first exemplary embodiment, a power source is limited only to an engine ENG, but in the transmission according to the second exemplary embodiment, by additionally applying a motor/generator MG as an auxiliary power source in addition to the engine ENG as a power source, the transmission according to the second exemplary embodiment can be applied as a transmission for a hybrid electric vehicle that can perform regenerative braking and EV driving, and this is different from the first exemplary embodiment.

That is, in a front side portion of first and second clutches CL1 and CL2 of the transmission of the first exemplary embodiment, by disposing the motor/generator MG at the output side of the engine ENG, power is connected to the motor/generator MG, and by disposing an engine clutch E/C between the motor/generator MG and the engine ENG, the engine clutch E/C can switch power of the engine ENG.

Therefore, in a state in which operation of the engine clutch E/C is controlled, as in the first exemplary embodiment, rotation power of the engine ENG can be shifted and output, operation of the engine clutch E/C is released, and when using rotation power of the motor/generator MG, EV driving can be performed.

The motor/generator MG may perform a function of a motor and a generator, and includes a stator ST that is fixed to a transmission housing H and a rotor RT that is selectively connected to first and second input shafts IS1 and IS2 through the first and second clutches CL1 and CL2 at the inside in a radial direction of the stator ST.

Further, the engine clutch E/C may be a common fluid multiplate clutch, as in the first and second clutches CL1 and CL2, and is controlled to operate or not operate by a hydraulic pressure control system.

Figure 4:
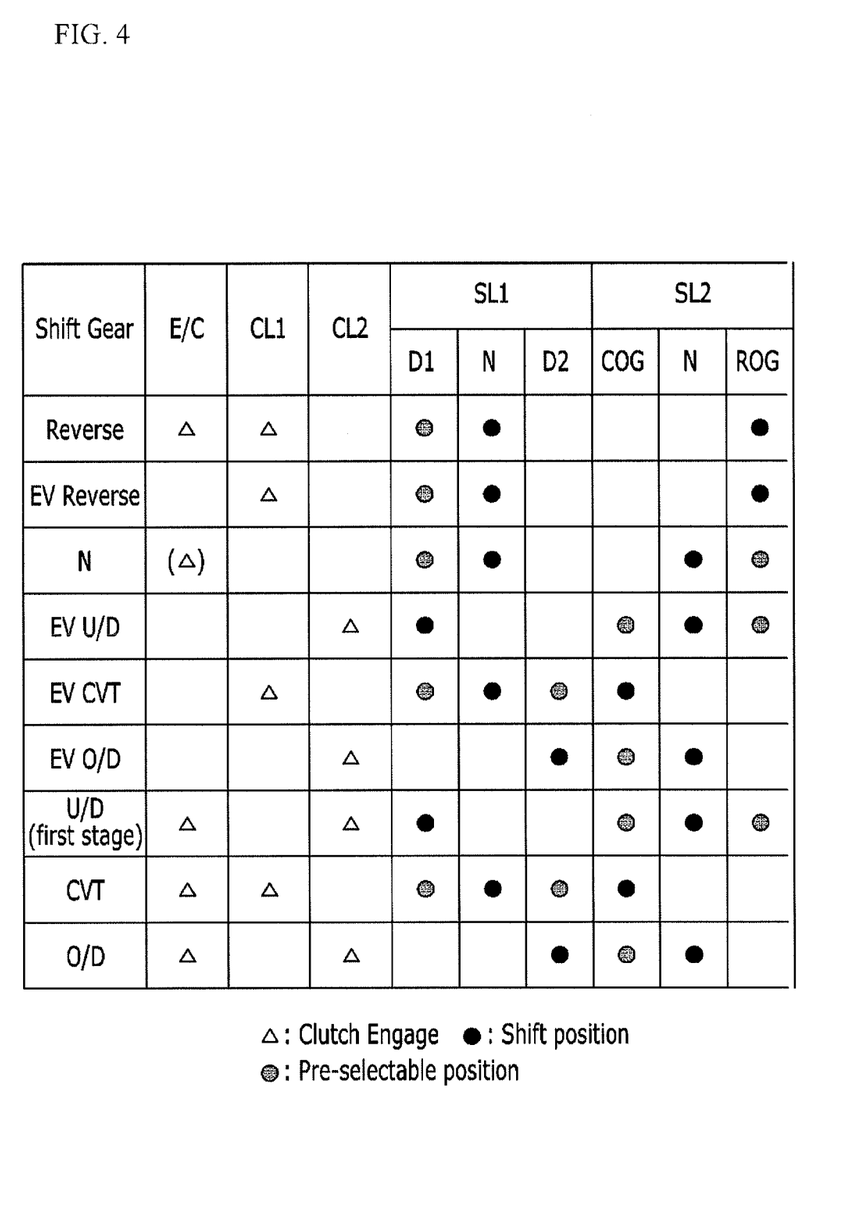
FIG. 4 is a shift operation table of a second exemplary transmission according to the present invention.

FIG. 4 is a shift operation table of a transmission according to a second exemplary embodiment of the present invention. Referring to FIG. 4, reverse, U/D, CVT, and O/D shift of a second exemplary embodiment is performed equally to that of the first exemplary embodiment, except that the engine clutch E/C is operated, and EV reverse, EV U/D, EV CVT, and EV O/D shift are added.

In the foregoing description, in newly added EV reverse, EV U/D, EV CVT, and EV O/D shift, a shift process and a power delivery path are the same as those of the first exemplary embodiment, except that a power source is converted from the engine ENG to the motor/generator MG and therefore a detailed description thereof will be omitted.

Figure 5:
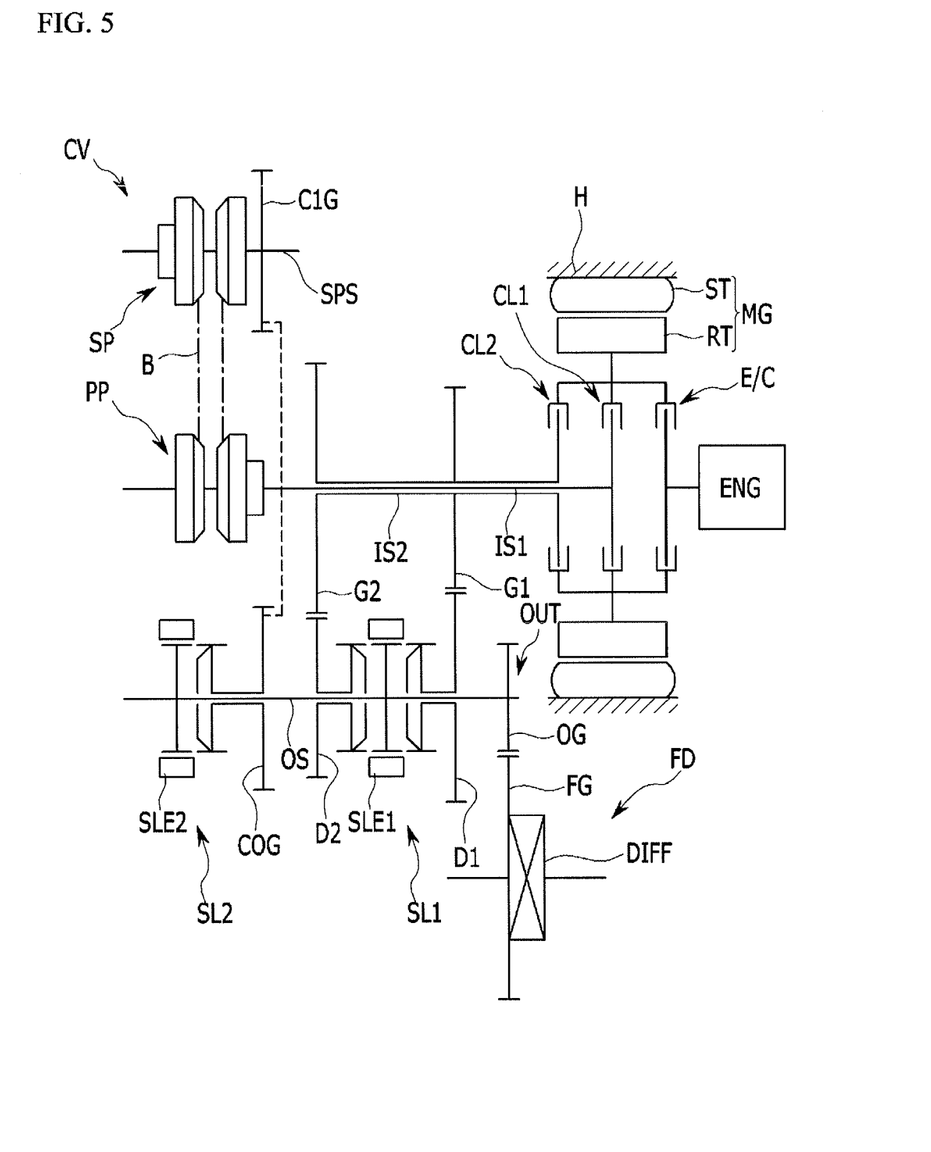
FIG. 5 is a schematic view illustrating a third exemplary transmission according to the present invention.

FIG. 5 is a schematic view illustrating a transmission according to a third exemplary embodiment of the present invention. Referring to FIG. 5, in the third exemplary embodiment, compared with the second exemplary embodiment, elements related to reverse shifting using rotation power of an engine ENG are omitted.

That is, the third exemplary embodiment omits a reverse driving gear RIG, a reverse idle mechanism RIDS, and a reverse driven gear ROG in the second exemplary embodiment and the third exemplary embodiment is different from the second exemplary embodiment in that reverse shifting may be performed by a motor/generator MG.

Figure 6:
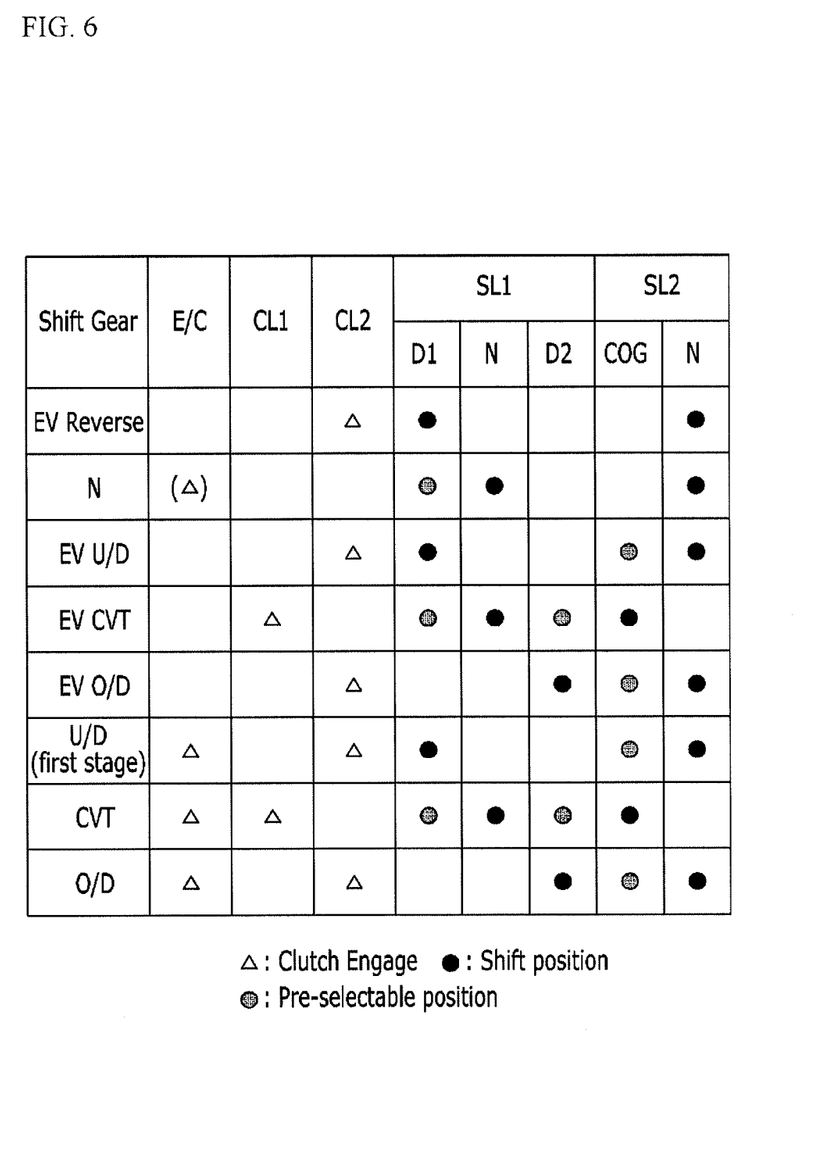
FIG. 6 is a shift operation table of a third exemplary transmission according to the present invention.

FIG. 6 is a shift operation table of a transmission according to a third exemplary embodiment of the present invention. Referring to FIG. 6, in the third exemplary embodiment, reverse driving by rotation power of the engine ENG cannot be performed, compared with the second exemplary embodiment.

EV reverse driving can be performed using a first synchronizer SL1. That is, a first driven gear D1 and an output shaft OS are synchronization-connected through a sleeve SLE1 of a first synchronizer SL1, and in a state in which operation of a second clutch CL2 is controlled, the motor/generator MG is reversely driven.

Therefore, while reverse rotation power of the motor/generator MG is transferred to a final reduction mechanism FD through the second clutch CL2, a second input shaft IS2, a first driving gear G1, the first driven gear D1, the output shaft OS, and an output gear OG, reverse driving is performed.

In this way, by additionally applying the motor/generator MG as an auxiliary power source to the transmission according to the first exemplary embodiment, a transmission according to second and third exemplary embodiments of the present invention can be used as a transmission for a hybrid electric vehicle that can perform regenerative braking and EV driving.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, the transmission comprising:
   a motor/generator that is selectively connected to an output side of an engine through an engine clutch;
   a first input shaft that is selectively connected to an output side of the motor/generator through a first clutch;
   a second input shaft that is a hollow shaft and that is disposed in a front side portion of the first input shaft without rotation interference with the first input shaft and that is selectively connected to the output side of the motor/generator through a second clutch, wherein first and second driving gears having different numbers of gear teeth are fixedly disposed on an exterior circumferential surface of the second input shaft;
   a continuously variable transmission mechanism (CV) that continuously shifts and outputs rotation power that is transferred from the first input shaft;
   a shift output mechanism that is disposed substantially in parallel at a predetermined gap from the first and second input shafts to receive rotation power that is transferred from the first and second driving gears on the second input shaft and the CV through driven gears that are coupled to an external gear and that selectively shifts and outputs the rotation power; and
   a final reduction mechanism that reduces the rotation power that is output from the shift output mechanism,
   wherein the shift output mechanism comprises:
      an output shaft that is disposed substantially in parallel at the predetermined gap from the first and second input shafts;

the driven gears including a first driven gear that is rotatably disposed on the output shaft and engaged to the first driving gear and a second driven gear that is rotatably disposed on the output shaft and engaged to the second driving gear; and a first synchronizer that is formed between the first driven gear and the second driven gear on the output shaft to selectively synchronization-connect the first driven gear or the second driven gear to the output shaft.

2. The transmission of claim 1, wherein a continuous shift driving gear is disposed on a driven pulley shaft of the CV.

3. The transmission of claim 2, wherein the shift output mechanism comprises:

an output gear that is integrally formed in one end portion of the output shaft;

a continuous shift driven gear that is disposed on the output shaft to be the external gear engaged to the continuous shift driving gear; and a second synchronizer that is formed adjacent to the continuous shift driven gear on the output shaft to selectively synchronization-connect the continuous shift driven gear to the output shaft.

4. The transmission of claim 3, wherein the first driving gear and the first driven gear have a smaller gear ratio than that of the continuous shift driving gear and the continuous shift driven gear, and the second driving gear and the second driven gear have a larger gear ratio than that of the continuous shift driving gear and the continuous shift driven gear.

5. The transmission of claim 1, wherein, in the CV, a driving pulley and a driven pulley continuously shift with a continuous gear ratio of a constant width.

* * * * *